US011992136B2

(12) United States Patent
Payne, Sr.

(10) Patent No.: US 11,992,136 B2
(45) Date of Patent: May 28, 2024

(54) DOOR HARDWARE DISPLAY SYSTEM

(71) Applicant: Jonathan P. Payne, Sr., Athens, GA (US)

(72) Inventor: Jonathan P. Payne, Sr., Athens, GA (US)

( * ) Notice: Subject to any disclaimer, the term of this patent is extended or adjusted under 35 U.S.C. 154(b) by 395 days.

(21) Appl. No.: 16/892,887

(22) Filed: Jun. 4, 2020

(65) Prior Publication Data

US 2021/0037993 A1 Feb. 11, 2021

Related U.S. Application Data

(60) Provisional application No. 62/856,985, filed on Jun. 4, 2019.

(51) Int. Cl.
*G09F 23/02* (2006.01)
*A47F 7/00* (2006.01)
*A47F 10/00* (2006.01)

(52) U.S. Cl.
CPC ................ *A47F 7/00* (2013.01); *A47F 10/00* (2013.01); *G09F 23/02* (2013.01)

(58) Field of Classification Search
CPC .... A47F 7/00; A47F 10/00; A47F 5/00; G09F 23/02; B65D 73/0085; B65D 73/0042; B65D 25/108; G09B 25/00; G09B 25/04
USPC ........... 40/538, 331; 206/463, 462, 471, 461
See application file for complete search history.

(56) References Cited

U.S. PATENT DOCUMENTS 3,786,578 A * 1/1974 Hufford .................... A47F 7/00 434/387
5,839,651 A * 11/1998 Teags ........................ B65D 5/68 229/125.32

FOREIGN PATENT DOCUMENTS

ES 1059309 U * 4/2005 ............... A47F 5/00

OTHER PUBLICATIONS

English Translation of the Foreign Patent Document ES1059309U By Albero, Published 2005 (Year: 2005).*

* cited by examiner

*Primary Examiner* — Gary C Hoge
(74) *Attorney, Agent, or Firm* — Cygnet IP Law, P.A.; Stephen W. Aycock, II

(57) ABSTRACT

Door hardware display systems are described.

20 Claims, 9 Drawing Sheets

DOOR HARDWARE DISPLAY SYSTEM

RELATED APPLICATIONS

This application claims the benefit of U.S. Application No. 62/856,985, entitled "DOOR HARDWARE DISPLAY SYSTEM," and filed on Jun. 4, 2019, which is incorporated herein by reference in its entirety.

TECHNICAL FIELD

Some implementations relate generally to product displays, and more particularly, to door hardware display systems.

BACKGROUND

Locksmiths and hardware stores sell door hardware such as locks, door knobs, and deadbolts. Customers often like to see how the door hardware will look when installed on a door, so sample locks are mounted on a lock display mount. Traditionally, lock display mounts have been made from solid wood (e.g., as shown in FIG. 1). They are bulky, difficult to manufacture, and expensive to ship. A need may exist for a display mount that can be manufactured on automated equipment and is inexpensive to ship.

SUMMARY

Some implementations can include a door hardware display system that can be made from any suitable material that can be formed or machined such as wood, metal, plastic and stone. Further, the configuration of the lock holes can be varied to accommodate different brands and styles of locks.

DETAILED DESCRIPTION

Some implementations can include a flat pack design as opposed to a solid block design associated with some conventional display designs. The flat pack design permits the door hardware display unit to be shipped in a knocked down form and packaged flat (e.g., in an envelope instead of a box), which can reduce shipping costs and storage space requirements.

Figure 1:
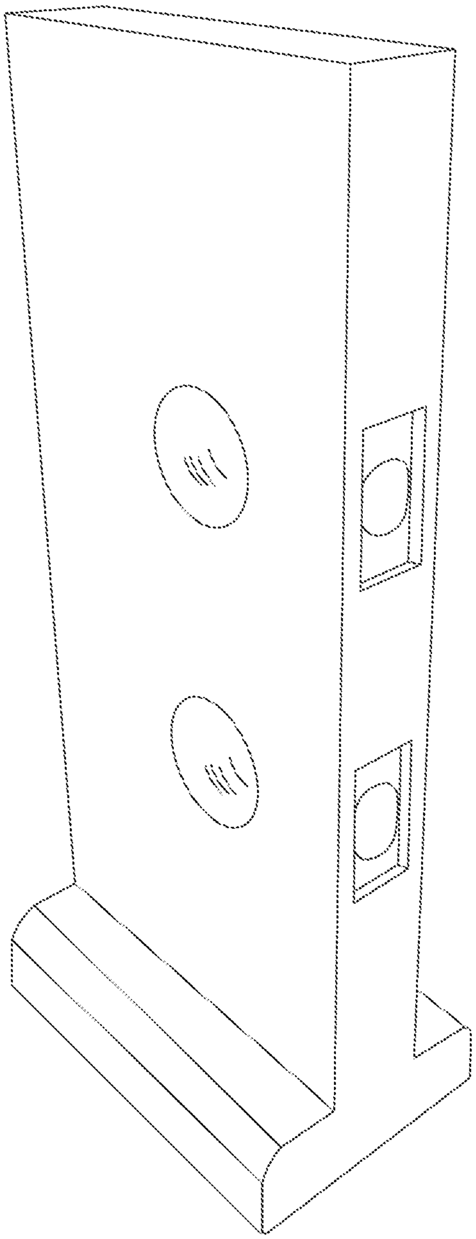
FIG. 1 Prior Art
FIG. 1 is a diagram of a conventional solid wood door hardware display system.
Figure 2:
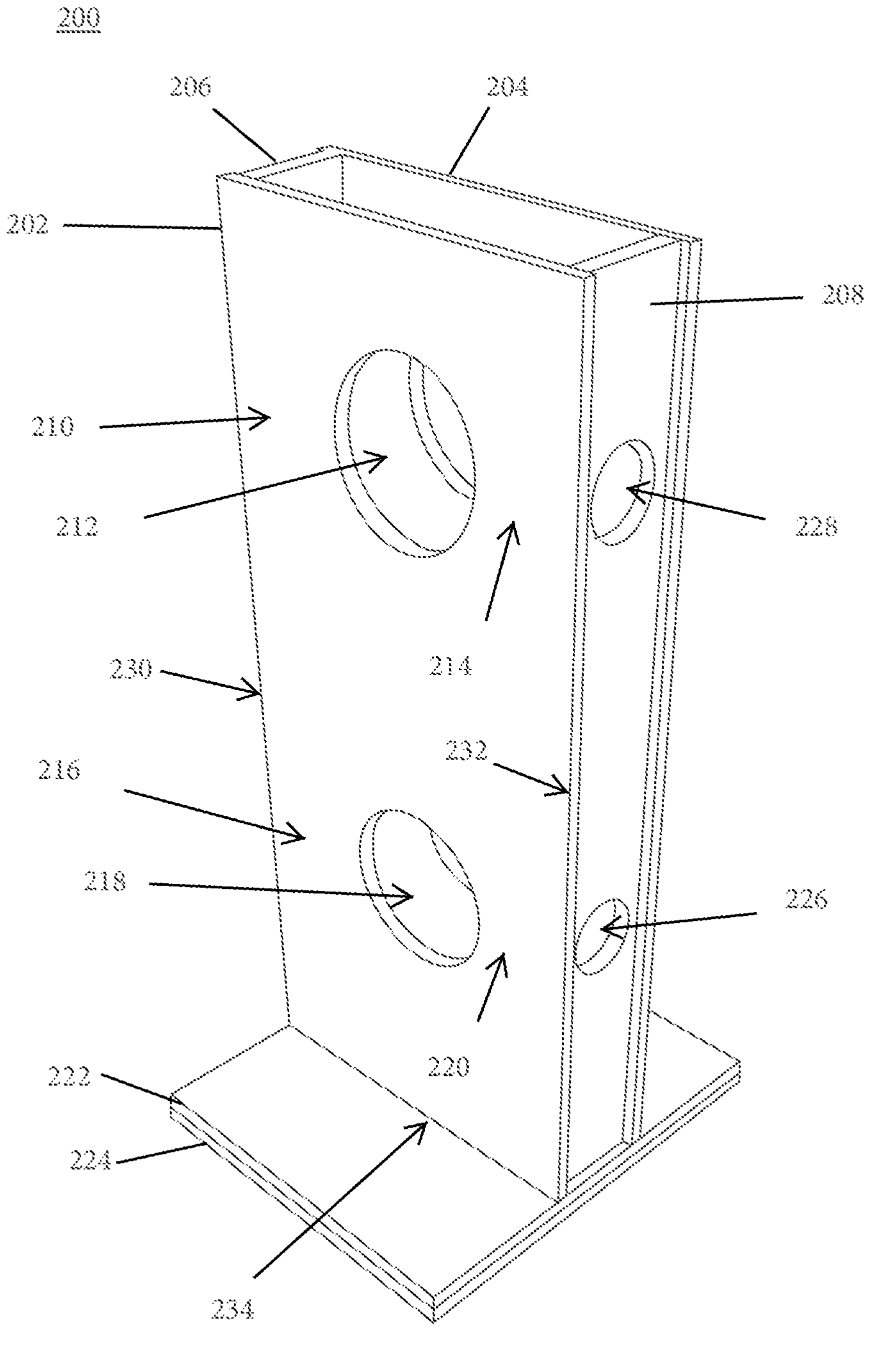
FIG. 2 is a diagram of a perspective view of an example door hardware display system in accordance with some implementations.

FIG. 2 is a diagram of a perspective view of an example door hardware display system in accordance with some implementations. The door hardware display system 200 includes a first rectangular panel 202, a second rectangular panel 204, a first rectangular side panel 206, a second rectangular side panel 208, a first square base plate 222, and a second square base plate 224.

The first rectangular panel 202 includes a first face (e.g., the outward facing surface) and a second face (e.g., the inward facing surface). The first rectangular panel 202 also includes a first side 230, a second side 232, and a bottom edge 234. The first rectangular panel 202 further includes a first large aperture 212 and a second large aperture 218. In some implementations, the first large aperture and the second large aperture are offset from the first side 230 by a first backset dimension (210 and 216, respectively) and are offset from the second side 232 by a second backset dimension (214 and 220, respectively). The second rectangular panel 204 is a mirror image of the first rectangular panel 202 (as shown in FIG. 3).

Figure 3:
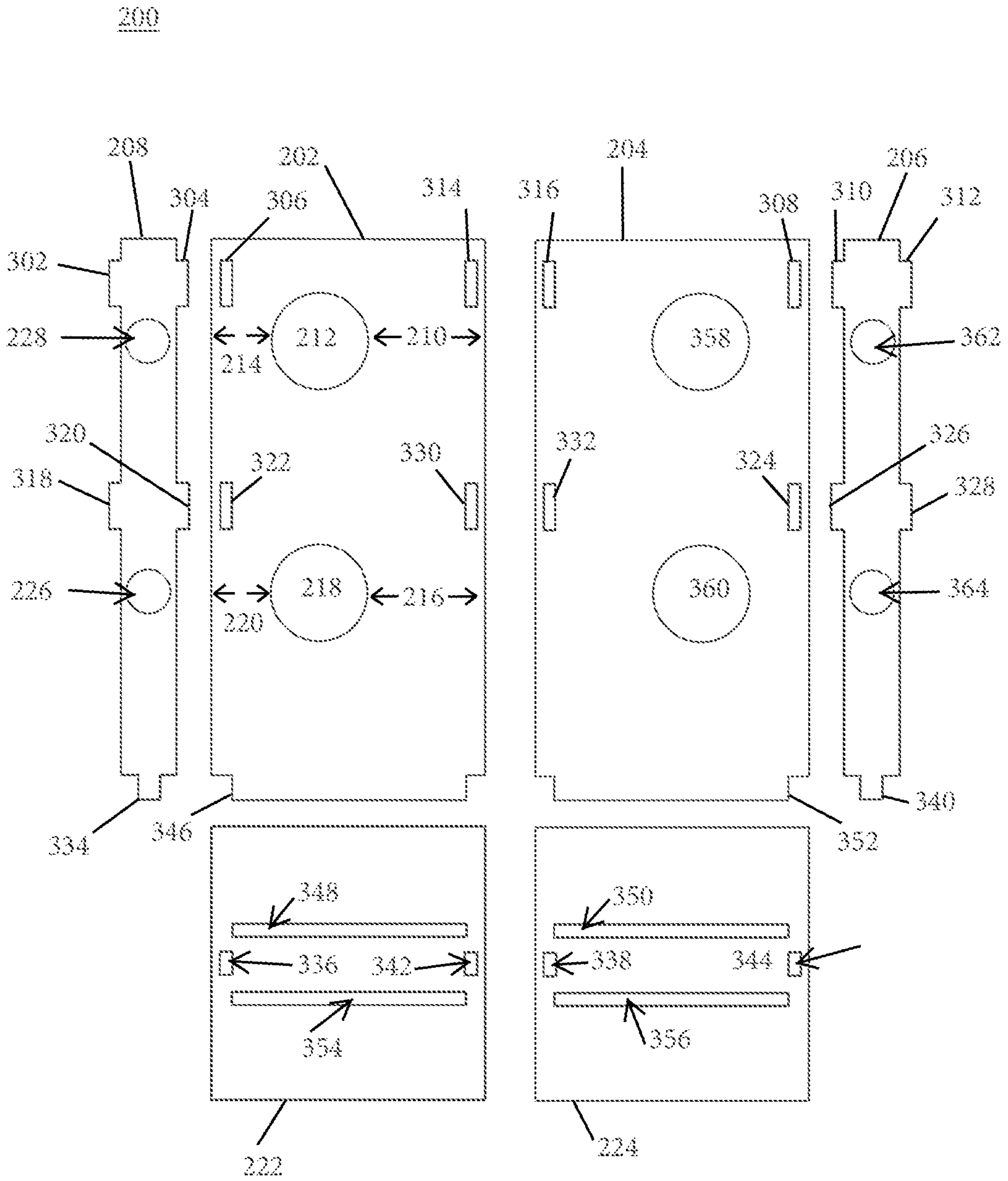
FIG. 3 is a diagram showing an exploded view of an example door hardware display system in accordance with some implementations.

The second rectangular side panel 208 includes a first small aperture 228 and a second small aperture 226, and, as shown in FIG. 3, two tabs on a first side (302 and 318), two tabs on a second side (304 and 320), and a bottom tab (334). The first rectangular side panel 206 includes the same features as the second rectangular side panel 208.

As shown in FIG. 3, the second face (inward facing surface) of the first rectangular panel 202 includes two slots (314 and 324) recessed in the second face along an edge of the first side of the first rectangular panel 202 and two slots (306 and 322) recessed in the second face along an edge of the second side of the first rectangular panel. The bottom edge 234 of the first rectangular panel includes a tab (shown in FIG. 3 at 346).

FIG. 3 is a diagram showing an exploded view of an example door hardware display system in accordance with some implementations. The door hardware display system 200 includes the first rectangular panel 202, the second rectangular panel 204, the first rectangular side panel 206, the second rectangular side panel 208, the first base plate 222, and the second base plate 224.

The second rectangular panel 204 having a first face (e.g., the outward facing surface) and a second face (e.g., the inward facing surface). The second rectangular panel 204 also includes a first side, a second side, and a bottom edge. The second rectangular panel 204 further includes a first large aperture 358 and a second large aperture 360. In some implementations, the first large aperture 358 and the second large aperture 360 are offset from the first side by a first backset dimension and are offset from the second side by a second backset dimension. As mentioned above, the second rectangular panel 204 is a mirror image of the first rectangular panel 202 (as shown in FIG. 3).

The first rectangular side panel 206 includes a first small aperture 362 and a second small aperture 364, and two tabs on a first side (310 and 326), two tabs on a second side (312 and 328), and a bottom tab (340). The first rectangular side panel 206 includes the same features as the second rectangular side panel 208.

The first square base plate 222 includes two long slots 348 and 354, and two short slots 336 and 342. The second square base plate 224 includes two long slots 350 and 356, and two short slots 338 and 344.

Figure 4:
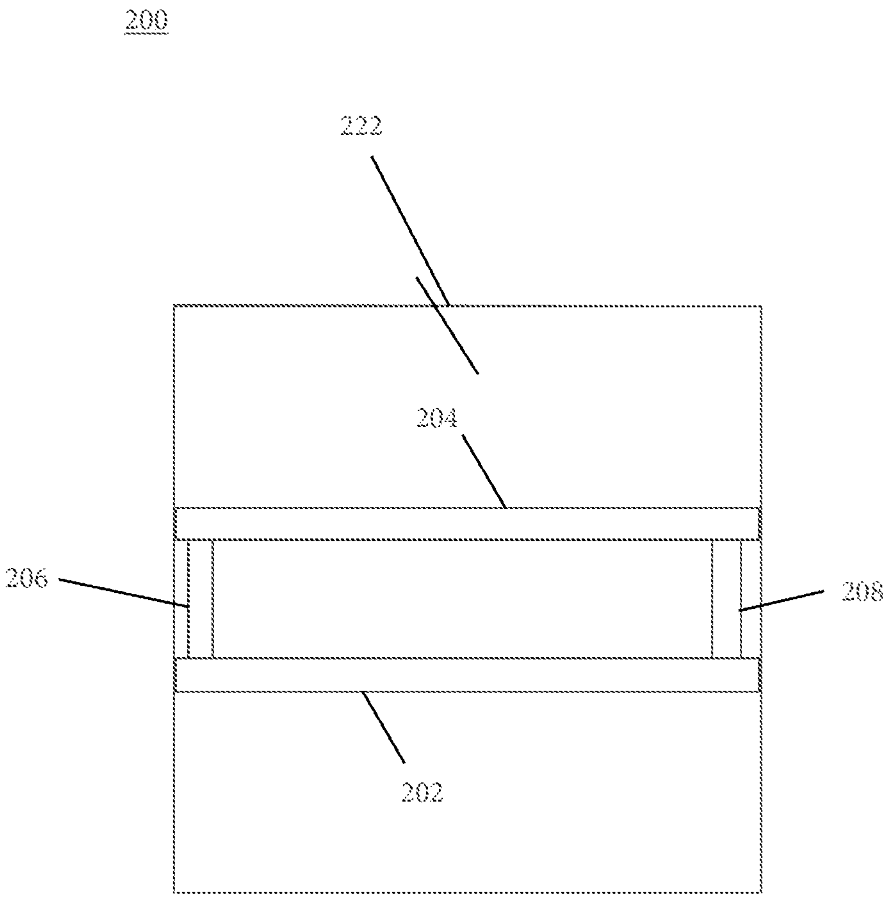
FIG. 4 is a diagram showing a top view of an example door hardware display system in accordance with some implementations.

FIG. 4 is a diagram showing a top view of an example door hardware display system in accordance with some implementations. The door hardware display system 200 includes a first rectangular panel 202, a second rectangular panel 204, a first rectangular side panel 206, a second rectangular side panel 208, and a first square base plate 222.

Figure 5:
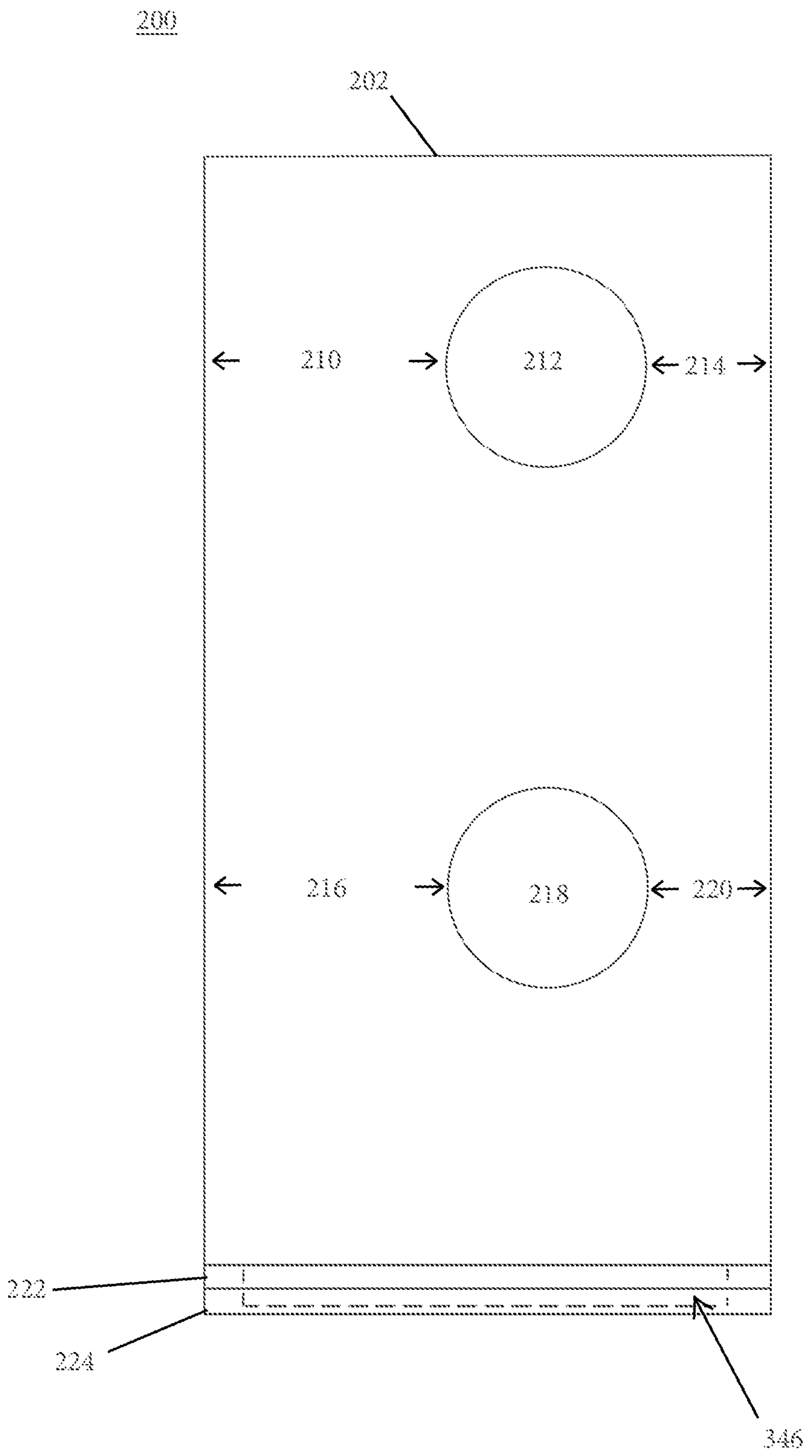
FIG. 5 is a diagram showing a front view of an example door hardware display system in accordance with some implementations.

FIG. 5 is a diagram showing a front view of an example door hardware display system in accordance with some implementations. As described above, the door hardware display system 200 includes a first rectangular panel 202. FIG. 5 shows tab 346 (in hidden lines) inserted into the first square base plate 222 and the second square base plate 224.

As shown in FIG. 5 with hidden lines, tab 346 on the bottom of the first rectangular panel 202 inserts through a slot of the first square base plate 222 and continues at least partially into a slot of the second square base plate 224. This creates a mechanical connection between the pieces. It will be appreciated that an implementation can include more or less of the tabs shown as examples herein.

Figure 6:
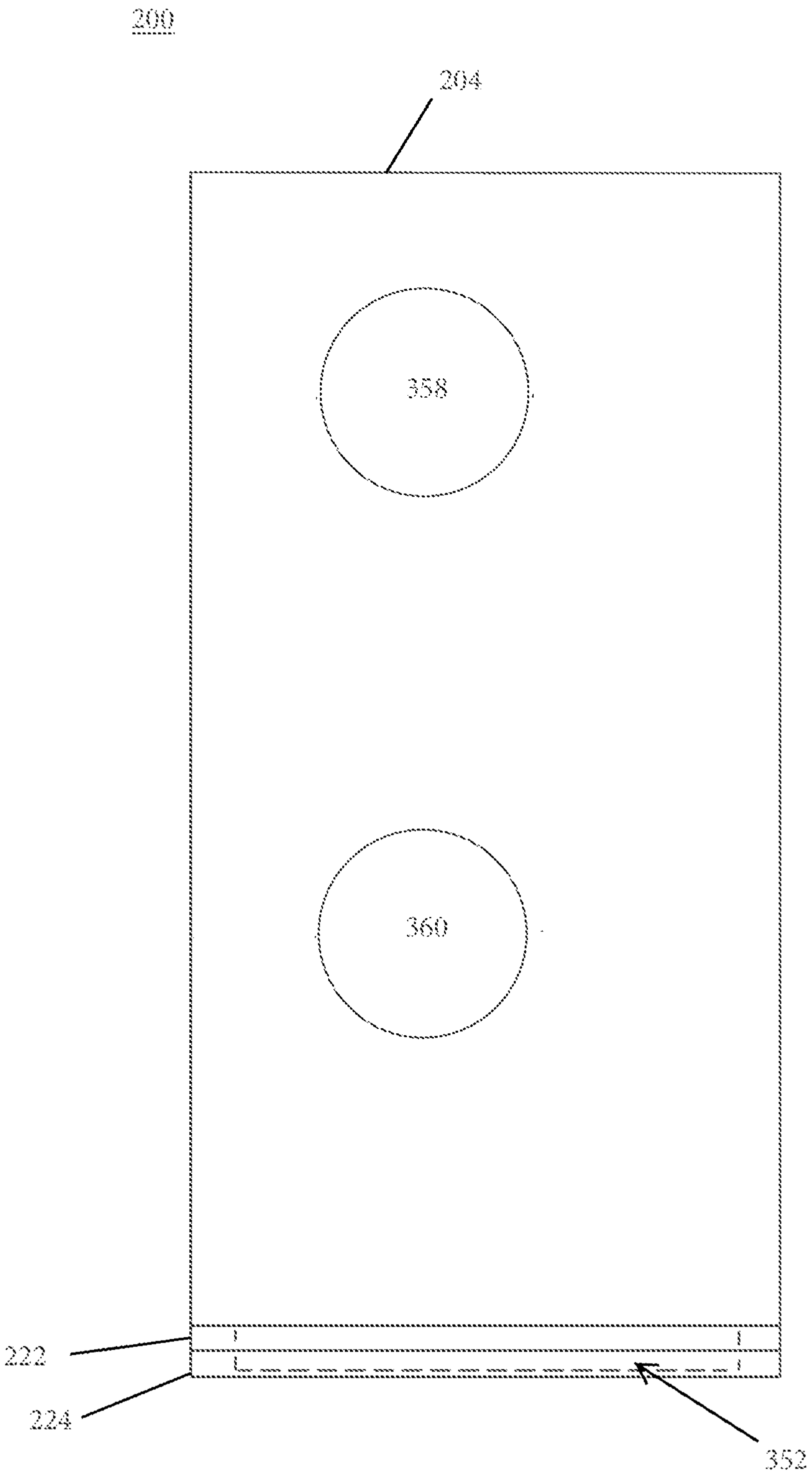
FIG. 6 is a diagram of a back view of an example door hardware display system in accordance with some implementations.

FIG. 6 is a diagram of a back view of an example door hardware display system in accordance with some implementations. As described above, the door hardware display system 200 includes a second rectangular panel 204. FIG. 6 shows the tab 352 (in hidden lines) inserted into the first square base plate 222 and the second square base plate 224.

As shown in FIG. 6 with hidden lines, the tab 352 on the bottom of the second rectangular panel 204 inserts through a slot of the first square base plate 222 and continues at least partially into a slot of the second square base plate 224. This creates a mechanical connection between the pieces. It will be appreciated that an implementation can include more or less of the tabs shown as examples herein.

Figure 7:
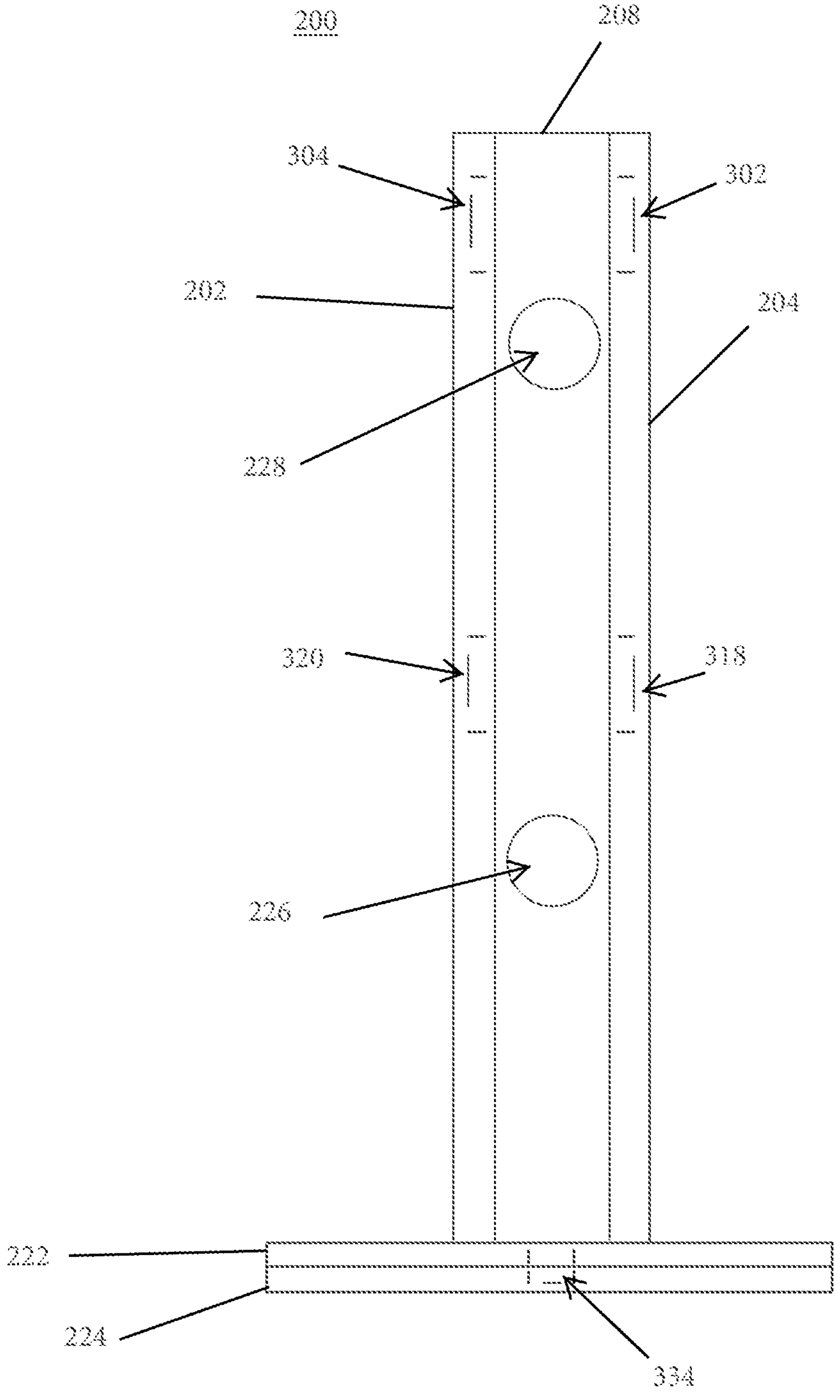
FIG. 7 is a diagram of a side view of an example door hardware display system in accordance with some implementations.

FIG. 7 is a diagram of a side view of an example door hardware display system 200 showing the first rectangular panel 202, the second rectangular panel 204, the first rectangular side panel 206, the first small aperture 228, the second small aperture 226, tabs (304, 320, 302, and 318), bottom tab 334, the first square base plate 222, and the second square base plate 224.

As shown in FIG. 7 with hidden lines tab 334 on the bottom of the first rectangular side panel 208 inserts through a slot of the first square base plate 222 and continues at least partially into a slot of the second square base plate 224. Tabs 304 and 320 insert into slots in the second face of the first rectangular panel 202. Tabs 302 and 318 insert into slots in the second face of the second rectangular panel 204. This creates a mechanical connection between the pieces. It will be appreciated that an implementation can include more or less of the tabs shown as examples herein.

Figure 8:
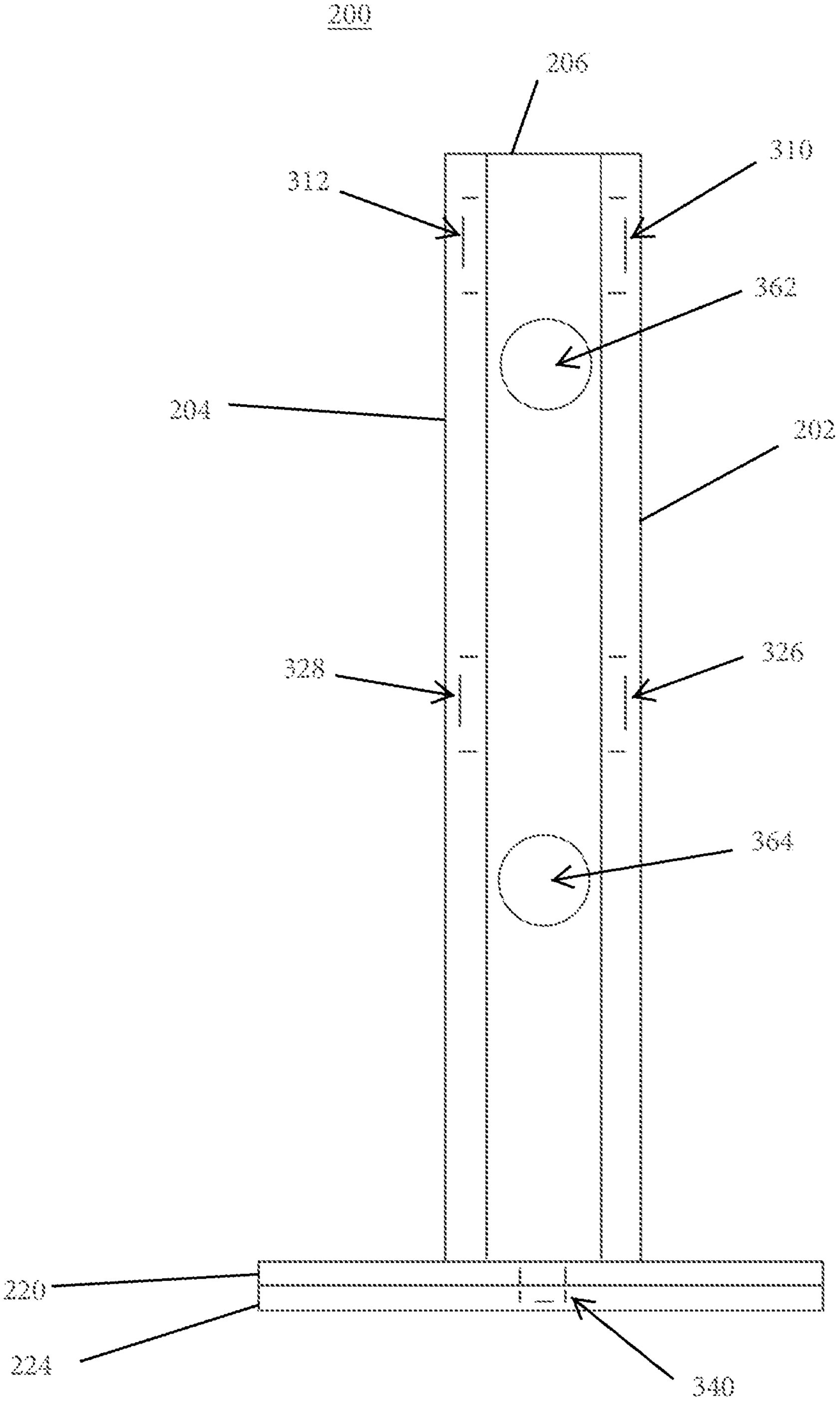
FIG. 8 is a diagram of a side view of an example door hardware display system in accordance with some implementations.

FIG. 8 is a diagram of a side view of an example door hardware display system 200 showing the first rectangular panel 202, the second rectangular panel 204, the first rectangular side panel 206, the first small aperture 362, the second small aperture 364, tabs (312, 328, 310, 326), bottom tab 340, the first square base plate 222, and the second square base plate 224.

As shown in FIG. 8 with hidden lines, tab 340 on the bottom of the second rectangular side panel 206 inserts through a slot of the first square base plate 222 and continues at least partially into a slot of the second square base plate 224. Tabs 310 and 326 insert into slots in the second face of the first rectangular panel 202. Tabs 312 and 328 insert into slots in the second face of the second rectangular panel 204. This creates a mechanical connection between the pieces. It will be appreciated that an implementation can include more or less of the tabs shown as examples herein.

The pieces can fit together via a mechanical connection such as tab and slot, etc. It will be appreciated that an implementation can include more or less of the parts shown as examples herein.

Figure 9:
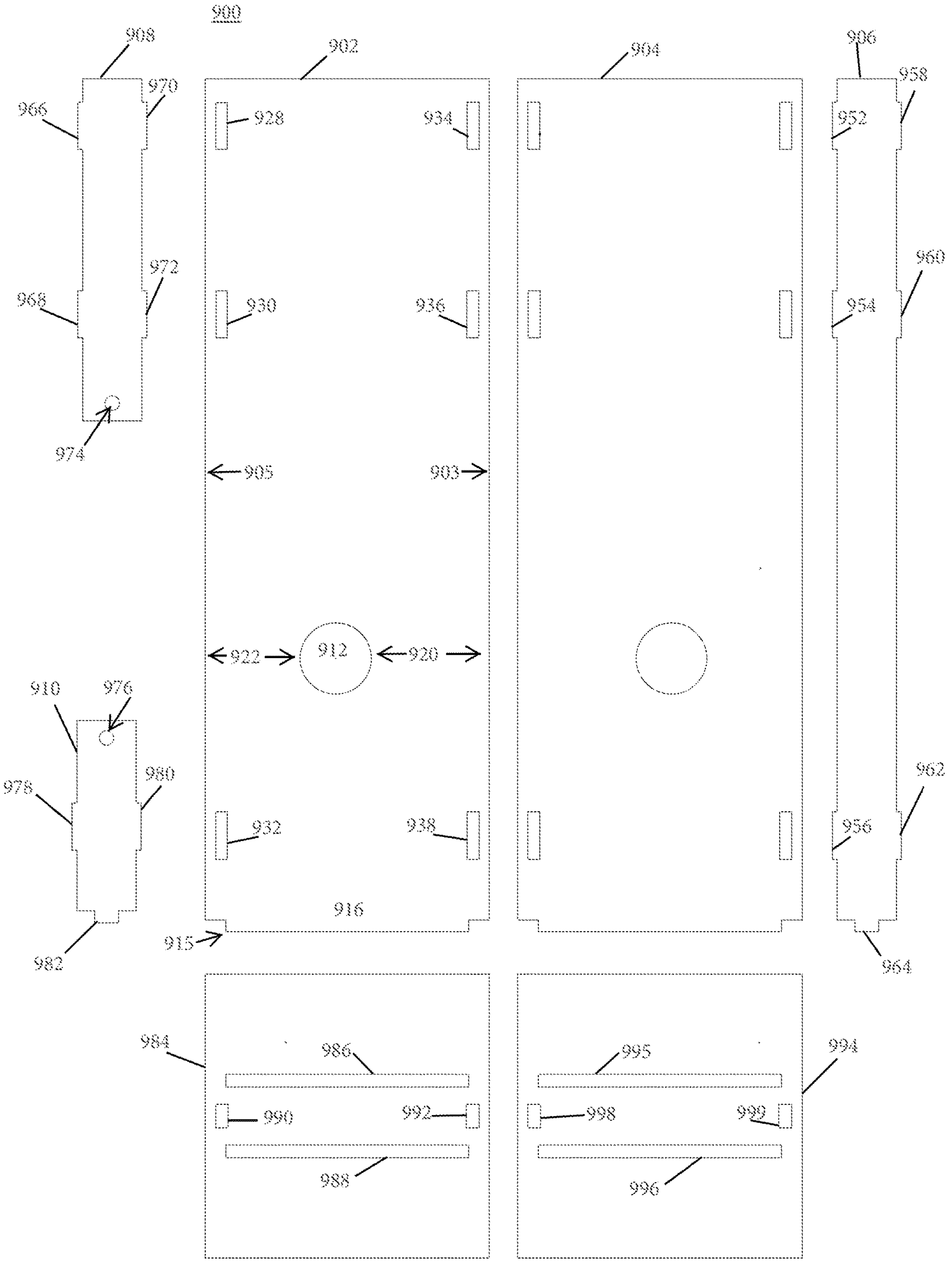
FIG. 9 is a diagram showing an exploded view of an example door hardware display system in accordance with some implementations.

FIG. 9 is a diagram of an exploded view of an example door hardware display system in accordance with some implementations. The door hardware display system 900 is constructed to accommodate mortise lock and door handle sets and includes a first rectangular panel 902, a second rectangular panel 904, a rectangular side panel 906, a first split side panel portion 908, a second split side panel portion 910, a first square base plate 984, and a second square base plate 994.

The first rectangular panel 902 having a first face (e.g., the outward facing surface) and a second face (e.g., the inward facing surface). The first rectangular panel 902 also includes a first side 903, a second side 905, and a bottom edge 916. The first rectangular panel 902 further includes a large aperture 912. In some implementations, the large aperture is offset from the first side 903 by a first backset dimension 920 and is offset from the second side 905 by a second backset dimension 922. The first rectangular panel 902 also includes three slots (934, 936 and 938) recessed in the second face (inward facing surface) along an edge of the first side of the first rectangular panel 902 and three slots (928, 930 and 932) recessed in the second face along an edge of the second side of the first rectangular panel. The bottom edge 916 of the first rectangular panel includes a tab 915. The second rectangular panel 904 is a mirror image of the first rectangular panel 902.

The rectangular side panel 906 includes three tabs on a first side (952, 954 and 956), three tabs on a second side (958, 960 and 962), and a bottom tab (964).

The first split side panel portion 908 includes two tabs on a first side (966 and 968), two tabs on a second side (970 and 972), and a small aperture at the bottom edge (974).

The second split side panel portion 910 includes one tab on a first side (978), one tab on a second side (980), a small aperture at the top edge (976), and a bottom tab (982).

The first square base plate 984 includes two long slots 986 and 988, and two short slots 990 and 992. The second square base plate 994 includes two long slots 995 and 996, and two short slots 998 and 999.

As shown in FIG. 9, some implementations can include two rectangular panels, one rectangular side panel, a first split side panel portion, a second split side panel portion and two base plates. The pieces can fit together via a mechanical connection such as tab and slot, etc. It will be appreciated that an implementation can include more or less of the parts shown as examples herein.

In some implementations the rectangular panels can include one or more large apertures.

In some implementations the rectangular side panels can include one or more small aperture. In some embodiments the rectangular side panels may be displayed having no small aperture. Some implementations can include a single large aperture and a plurality of small apertures (e.g., for an electronic lock set).

Some implementations can include a "double backset" design. As shown in the figures, large holes are not centered in the face. The dimension from one edge to the center of the large hole is 2⅜" and from the other edge, 2¾".

Some implementations provide a uniform visual appearance in which all units look the same or very similar.

Currently, lock shops and hardware stores use mounts provided by the lock makers. All of them may look different, which results in a "hodge podge" of different looking displays in a showroom.

Implementations of the disclosed systems include displays that provide a visually consistent appearance and don't detract from the main purpose of the displays, which is to show off the hardware, not the wooden display.

It is, therefore, apparent that there is provided, in accordance with the various embodiments disclosed herein, door hardware display systems.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A door hardware display mount comprising:

a first rectangular panel having a first face, a second face, a first side, a second side, a bottom edge, a first large aperture, and a second large aperture, wherein each of the first large aperture and the second large aperture are offset from the first side by a first backset dimension and each are offset from the second side by a second backset dimension, wherein the second face of the first rectangular panel includes two slots recessed in the second face along an edge of the first side of the first rectangular panel and two slots recessed in the second face along an edge of the second side of the first rectangular panel, and wherein the bottom edge of the first rectangular panel includes a tab, wherein the tab is substantially parallel to the surface of the first rectangular panel;

a second rectangular panel having a first face and a second face, wherein the first face of the second rectangular panel has two large apertures with a first backset dimension from a first side of the second rectangular panel and a second backset dimension from a second side of the second rectangular panel, wherein the second face of the second rectangular panel includes two slots recessed in the surface along an edge of the first side of the second rectangular panel and two slots recessed in the surface along an edge of the second side of the second rectangular panel, and wherein a bottom edge of the second rectangular panel includes a tab, wherein the tab is substantially parallel to the surface of the second rectangular panel;

a first rectangular side panel having a first long edge, a second long edge, a first short edge, a second short edge, a first small aperture, and a second small aperture, wherein the first short edge is flat and the second short edge includes a tab protruding from the second short edge, wherein the tab is substantially parallel to the surface of the second short edge, and wherein both long edges include two tabs each, wherein each tab is substantially parallel to the surface of the respective long edge;

a second rectangular side panel having a first long edge and a second long edge, a first short edge and a second short edge, a first small aperture, and a second small aperture, wherein the first short edge is flat and the second short edge includes a tab protruding from the second short edge, wherein the tab is substantially parallel to the surface of the second short edge, wherein both long edges include two tabs each, wherein each tab is substantially parallel to the surface of the respective long edge;

a first square base plate having two long slots and two short slots, wherein the two long slots are substantially parallel to one another, and wherein the two short slots are perpendicular to the long slots and substantially parallel to one another; and a second square base plate having two long slots and two short slots, wherein the two long slots are substantially parallel to one another, and wherein the two short slots are perpendicular to the long slots but substantially parallel to one another.

2. The door hardware display mount of claim 1, wherein the door hardware display mount components are configured to be packed flat for shipping.

3. The door hardware display mount of claim 1, wherein the tab of the bottom edge of the first rectangular panel and the tab of the bottom edge of the second rectangular panel are configured to pass through respective long slots of the first square base plate and enter respective long slots of the second square base plate.

4. The door hardware display mount of claim 1, wherein the tab of the second short edge of the first rectangular side panel and the tab of the second short edge of the second rectangular side panel are configured to pass through respective short slots of the first square base plate and enter respective short slots of the second square base plate.

5. The door hardware display mount of claim 1, wherein the tabs of one of the long edges of the first rectangular side panel and the tabs of one of the long edges of the second rectangular side panel are configured to enter respective slots recessed in the second face of the first rectangular panel, and wherein the tabs of the other long edge of the first rectangular side panel and the tabs of the other long edge of the second rectangular side panel are configured to enter respective slots recessed in the second face of the second rectangular panel.

6. The door hardware display mount of claim 1, wherein the first backset dimension is 2⅜" and the second backset dimension is 2¾".

7. A door hardware display mount comprising:

a first rectangular panel having a first face, a second face, a first side, a second side, a bottom edge, and at least one large aperture offset from the first side by a first backset dimension and offset from the second side by a second backset dimension, wherein the second face of the first rectangular panel includes two slots recessed in the second face along an edge of the first side of the first rectangular panel and two slots recessed in the second face along an edge of the second side of the first rectangular panel, and wherein the bottom edge of the first rectangular panel includes a tab, wherein the tab is substantially parallel to the surface of the first rectangular panel;

a second rectangular panel having a first face and a second face, wherein the first face of the second rectangular panel includes at least one large aperture with a first backset dimension from a first side of the second rectangular panel and a second backset dimension from a second side of the second rectangular panel, wherein the second face of the second rectangular panel includes two slots recessed in the surface along an edge of the first side of the second rectangular panel and two slots recessed in the surface along an edge of the second side of the second rectangular panel, and wherein a bottom edge of the second rectangular panel includes a tab, wherein the tab is substantially parallel to the surface of the second rectangular panel;

a first rectangular side panel having a first long edge, a second long edge, a first short edge, a second short edge, at least one small aperture, wherein the first short edge is flat and the second short edge includes a tab protruding from the second short edge, wherein the tab is substantially parallel to the surface of the second short edge, and wherein both long edges include two tabs each, wherein each tab is substantially parallel to the surface of the respective long edge;

a second rectangular side panel having a first long edge and a second long edge, a first short edge and a second short edge, and at least one small aperture,- wherein the first short edge is flat and the second short edge includes a tab protruding from the second short edge, wherein the tab is substantially parallel to the surface of the second short edge, wherein both long edges include two tabs each, wherein each tab is substantially parallel to the surface of the respective long edge;

a first square base plate having two long slots and two short slots, wherein the two long slots are substantially parallel to one another, and wherein the two short slots are perpendicular to the long slots and substantially parallel to one another; and a second square base plate having two long slots and two short slots, wherein the two long slots are substantially parallel to one another, and wherein the two short slots are perpendicular to the long slots and substantially parallel to one another.

8. The door hardware display mount of claim 7, wherein the door hardware display mount components are configured to be packed flat for shipping.

9. The door hardware display mount of claim 7, wherein the first and second rectangular panels define a single large aperture each, and the first rectangular side panel defines a plurality of small apertures.

10. The door hardware display mount of claim 7, wherein the tab of the bottom edge of the first rectangular panel and the tab of the bottom edge of the second rectangular panel are configured to pass through respective long slots of the first square base plate and enter respective long slots of the second square base plate.

11. The door hardware display mount of claim 7, wherein the tab of the second short edge of the first rectangular side panel and the tab of the second short edge of the second rectangular side panel are configured to pass through respective short slots of the first square base plate and enter respective short slots of the second square base plate.

12. The door hardware display mount of claim 7, wherein the tabs of one of the long edges of the first rectangular side panel and the tabs of one of the long edges of the second rectangular side panel are configured to enter respective slots recessed in the second face of the first rectangular panel, and wherein the tabs of the other long edge of the first rectangular side panel and the tabs of the other long edge of the second rectangular side panel are configured to enter respective slots recessed in the second face of the second rectangular panel.

13. The door hardware display mount of claim 7, wherein the first backset dimension is 2⅜" and the second backset dimension is 2¾".

14. A door hardware display mount comprising:

a first rectangular panel having a first face, a second face, a first side, a second side, a bottom edge, and at least one large aperture offset from the first side by a first backset dimension and offset from the second side by a second backset dimension, wherein the second face of the first rectangular panel includes three slots recessed in the second face along an edge of the first side of the first rectangular panel and three slots recessed in the second face along an edge of the second side of the first rectangular panel, and wherein the bottom edge of the first rectangular panel includes a tab, wherein the tab is substantially parallel to the surface of the first rectangular panel;

a second rectangular panel having a first face and a second face, wherein the first face of the second rectangular panel includes at least one large aperture with a first backset dimension from a first side of the second rectangular panel and a second backset dimension from a second side of the second rectangular panel, wherein the second face of the second rectangular panel includes three slots recessed in the surface along an edge of the first side of the second rectangular panel and three slots recessed in the surface along an edge of the second side of the second rectangular panel, and wherein a bottom edge of the second rectangular panel includes a tab, wherein the tab is substantially parallel to the surface of the second rectangular panel;

a first rectangular side panel having a first long edge, a second long edge, a first short edge, a second short edge, at least one small aperture, wherein the first short edge is flat and the second short edge includes a tab protruding from the second short edge, wherein the tab is substantially parallel to the surface of the second short edge, and wherein both long edges include three tabs each, wherein each tab is substantially parallel to the surface of the respective long edge;

a second rectangular side panel having a first long edge and a second long edge, a first short edge and a second short edge, and at least one small aperture, wherein the first short edge is flat and the second short edge includes a tab protruding from the second short edge, wherein the tab is substantially parallel to the surface of the second short edge, wherein both long edges include three tabs each, wherein each tab is substantially parallel to the surface of the respective long edge;

a first square base plate having two long slots and two short slots, wherein the two long slots are substantially parallel to one another, and wherein the two short slots are perpendicular to the long slots and substantially parallel to one another; and a second square base plate having two long slots and two short slots, wherein the two long slots are substantially parallel to one another, and wherein the two short slots are perpendicular to the long slots and substantially parallel to one another.

15. The door hardware display mount of claim 14, wherein the door hardware display mount components are configured to be packed flat for shipping.

16. The door hardware display mount of claim 14, wherein the tab of the bottom edge of the first rectangular panel and the tab of the bottom edge of the second rectangular panel are configured to pass through respective long slots of the first square base plate and enter respective long slots of the second square base plate.

17. The door hardware display mount of claim 14, wherein the tab of the second short edge of the first rectangular side panel and the tab of the second short edge of the second rectangular side panel are configured to pass through respective short slots of the first square base plate and enter respective short slots of the second square base plate.

18. The door hardware display mount of claim 14, wherein the tabs of one of the long edges of the first rectangular side panel and the tabs of one of the long edges of the second rectangular side panel are configured to enter respective slots recessed in the second face of the first rectangular panel, and wherein the tabs of the other long edge of the first rectangular side panel and the tabs of the other long edge of the second rectangular side panel are configured to enter respective slots recessed in the second face of the second rectangular panel.

19. The door hardware display mount of claim 14, wherein the first and second rectangular panels define a single large aperture each, and the first rectangular side panel defines a plurality of small apertures.

20. The door hardware display mount of claim 14, wherein the first backset dimension is 2⅜" and the second backset dimension is 2¾".

* * * * *